US007245452B1

(12) United States Patent
Riener et al.

(10) Patent No.: US 7,245,452 B1
(45) Date of Patent: Jul. 17, 2007

(54) DISK DRIVE WITH ALTITUDE DETECTION VIA ANALYSIS OF NON-REPEATABLE RUNOUT COMPONENTS

(75) Inventors: Timothy A. Riener, Fremont, CA (US); Erhard Schreck, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 65 days.

(21) Appl. No.: 11/256,299

(22) Filed: Oct. 21, 2005

Related U.S. Application Data

(60) Provisional application No. 60/659,032, filed on Mar. 4, 2005.

(51) Int. Cl.
*G11B 21/02* (2006.01)
*G11B 5/58* (2006.01)
*G11B 5/596* (2006.01)

(52) U.S. Cl. .................. 360/75; 360/77.01; 360/78.04

(58) Field of Classification Search .................. None
See application file for complete search history.

(56) References Cited

U.S. PATENT DOCUMENTS

| 6,771,440 B2* | 8/2004 | Smith ........................ 360/31 |
| 2003/0193727 A1* | 10/2003 | Fioravanti et al. ............ 360/31 |
| 2006/0044666 A1* | 3/2006 | Fukushima .................. 360/75 |
| 2006/0146443 A1* | 7/2006 | Chang et al. ............ 360/97.02 |

* cited by examiner

*Primary Examiner*—Wiliam Korzuch
*Assistant Examiner*—Jason Olson
(74) *Attorney, Agent, or Firm*—Myers Bigel Sibley & Sajovec, P.A.

(57) ABSTRACT

A controller for a disk drive measures track misregistration, extracts non-repeatable runout from measured track misregistration, determines one or more components of non-repeatable runout at various radial locations of a disk, and compares the determined components to known values at different altitudes to determine an operating altitude of a disk drive.

19 Claims, 5 Drawing Sheets

DISK DRIVE WITH ALTITUDE DETECTION VIA ANALYSIS OF NON-REPEATABLE RUNOUT COMPONENTS

RELATED APPLICATION

This application claims the benefit of and priority to U.S. Provisional Patent Application No. 60/659,032, filed Mar. 4, 2005, the disclosure of which is incorporated herein by reference as if set forth in its entirety.

FIELD OF THE INVENTION

The present invention generally relates to digital data storage devices and, more particularly, to determining the altitude at which a digital data storage device is operating.

BACKGROUND OF THE INVENTION

Disk drives are digital data storage devices which can enable a host device to store and retrieve large amounts of data in a fast and efficient manner. A typical disk drive includes a plurality of magnetic recording disks which are mounted to a rotatable hub of a spindle motor and rotated at a high speed. An array of read/write transducers is disposed adjacent surfaces of the disks to transfer data between the disks and the host device. The transducers can be radially positioned over the disks by a rotary actuator and a servo system.

A plurality of nominally concentric tracks can be defined on each disk surface. As understood by those skilled in the art, a preamp and driver circuit generates write currents that are used by a first transducer to selectively magnetize the tracks during a data write command. A secondary transducer, generally proximate to the first transducer, amplifies read signals detected by the transducer from the selective magnetization of the tracks during a data read command. Under certain configurations, the first and second transducers can be fashioned to be one in the same. A read/write channel and interface circuit are connected to the preamp and driver circuit to transfer the data between the disks and the host device.

Each transducer (or transducer pair) is connected to a structure referred to as a "slider." The slider is mounted on a spring-loaded flexible beam structure that can cause the slider with the connected transducer to press against a disk surface when the disk is stationary. When the disk spins up to operating speed, the high rotational speed causes air to flow under the slider thereby generating a fluid or hydrodynamic bearing, commonly referred to as an "air bearing" by those skilled in the art. The purpose of the air bearing is to provide adequate and appropriate force on the transducer-bearing slider so that a threshold separation is maintained between the transducer and the disk. Thus, a transducer floats over the surface of a spinning disk without physically touching the disk. The space between a transducer and a spinning disk (i.e., the transducer-to-disk clearance) is referred to as the "head/disk clearance" or just "clearance." Clearance is an important parameter for operation of a disk drive. If clearance is too large, a transducer cannot properly read and write a disk. If clearance is too small, there is chance that the transducer will crash into the spinning disk and cause physical damage to either or both the transducer and disk (referred to as "disk crash"). The operating clearance is also important even in the intermediate case(s) where the head has neither excessively large clearance nor unacceptably small clearance. The significance of this last regime is an outcome of the fact that optimal reading and writing performance may be carefully tuned under a fairly small range of allowable clearance values.

The altitude at which a disk drive operates influences clearance. At high altitudes, the reduced air pressure generally diminishes the ability of the air bearing to maintain proper clearance, which can cause a disk crash. Unfortunately, conventional disk drives are not configured to detect operating altitude. Although numerous altitude detection technologies exist that utilize pressure transducers for barometric estimation of altitude, cost, measurement sensitivity, accuracy and packaging concerns have prevented incorporation into disk drives here-to-date. As such, a need exists for an economical, yet reliable, way to detect operating altitudes of disk drives.

SUMMARY OF THE INVENTION

In view of the above discussion, a controller for a disk drive is configured to measure track misregistration, extract non-repeatable runout (NRRO) from measured track misregistration, determine one or more contributory components to (NRRO) at various radial locations of a disk, and compare the determined components to known values at different altitudes. For example, a controller is configured to analyze contributory components to NRRO at a storage surface inner diameter (ID) region, middle diameter (MD) region, and an outer diameter (OD) region.

Disk drives capable of detecting altitude, according to embodiments of the present invention, are advantageous because they may not require additional hardware or test techniques. Embodiments of the present invention may utilize software-based algorithms (i.e., firmware) to perform in situ analysis of contributory components to NRRO at one or more storage surface locations, and to compare NRRO contributory components to known values for the one or more NRRO contributory components at different altitudes.

DETAILED DESCRIPTION OF THE INVENTION

Figure 1:
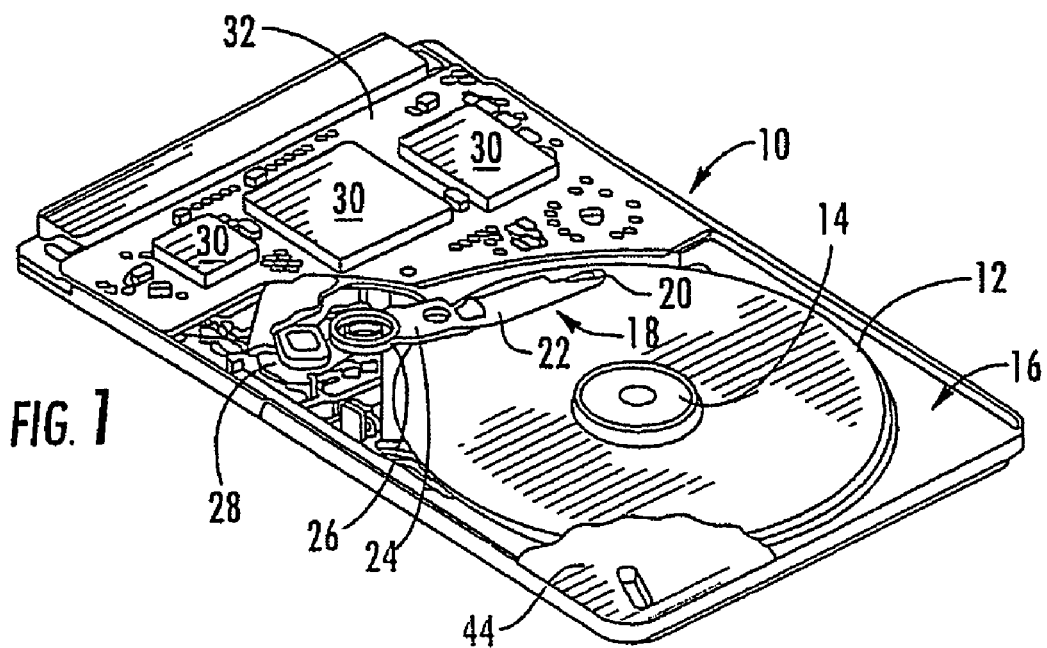
FIG. 1 is a perspective view of a disk drive that is configured to detect operating altitude in accordance with some embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise. All publications, patent applications, patents, and other references mentioned herein are incorporated herein by reference in their entireties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first" element, component, region, layer or section discussed below could also be termed a "second" element, component, region, layer or section without departing from the teachings of the present invention. The sequence of operations (or steps) is not limited to the order presented in the claims or figures unless specifically indicated otherwise.

The terms "data storage disk" and "disk" are intended to be interchangeable herein.

The terms "transducer", "read/write transducer" and "data transducer" are intended to be interchangeable herein.

The present invention may be embodied in hardware (analog and/or discrete) and/or in software (including firmware, resident software, micro-code, etc.). Consequently, as used herein, the term "signal" may take the form of a continuous waveform and/or discrete value(s), such as digital value(s) in a memory or register.

The present invention is described below with reference to block diagrams of disk drives, disks, controllers, and operations according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

A simplified diagrammatic representation of an exemplary disk drive that can incorporate embodiments of the present invention, generally designated as 10, is illustrated in FIG. 1. The disk drive 10 includes a disk stack 12 (illustrated as a single disk in FIG. 1) that is rotated by a spindle motor 14. The spindle motor 14 is mounted to a base plate 16. An actuator arm assembly 18 is also mounted to the base plate 16. The disk drive 10 is configured to store and retrieve data responsive to write commands and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and retrieve data in the disk drive 10.

The actuator arm assembly 18 includes a plurality of transducers 20 mounted to flexure arms 22 which are attached to actuator arms 24 that can rotate about a pivot bearing assembly 26. Each transducer 20 may include, but is not limited to, a magnetoresistive (MR) element, a thin film inductive (TFI) element, and/or an inductive coil element. The actuator arm assembly 18 also includes a voice coil motor (VCM) 28 which moves the transducers 20 relative to the disk stack 12. The spindle motor 14 and actuator arm assembly 18 are coupled to a controller and associated electronic circuits (collectively indicated as 30) mounted to a printed circuit board 32. The controller 30 may include analog and/or digital circuitry, and typically includes a digital signal processor (DSP), a microprocessor-based controller and a random access memory (RAM) device.

Figure 2:
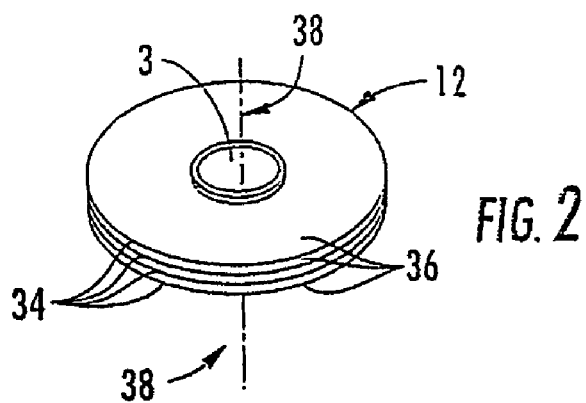
FIG. 2 is a perspective view of a disk stack having a plurality of data storage disks.

Referring now to the illustration of FIG. 2, the disk stack 12 typically includes a plurality of disks 34, each of which may have a pair of disk surfaces 36, 36. The disks 34 are mounted on a cylindrical shaft and are configured to rotate about axis 38. The spindle motor 14, as mentioned above, rotates the disk stack 12. Although the disks 34 are described as magnetic disks for purposes of illustration, alternatively, they may be optical disks or any other type of rewritable data storage disk.

Figure 3:
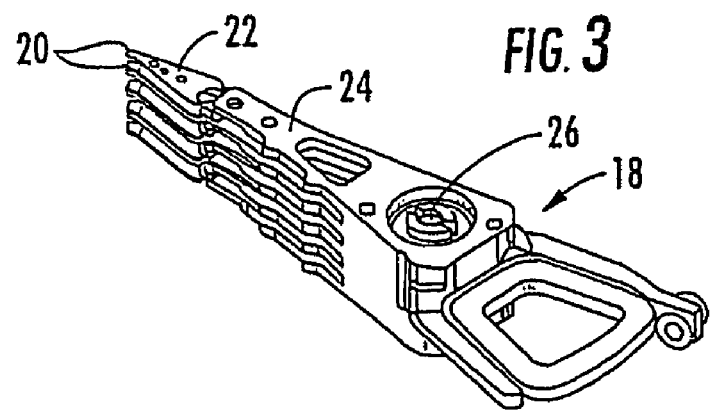
FIG. 3 is a perspective view of a portion of an actuator arm assembly having a plurality of actuator arms.

Referring to FIGS. 1 and 3, the plurality of transducers 20 are each adjacent to a different one of the disk surfaces 36. Each transducer 20 is mounted to a corresponding flexure arm 22 which is attached to a corresponding portion of the actuator arm 24 that can rotate about the pivot bearing assembly 26. The VCM 28 operates to move the actuator arm 24 and the transducers 20 relative to their respective disk surfaces 36.

Figure 4:
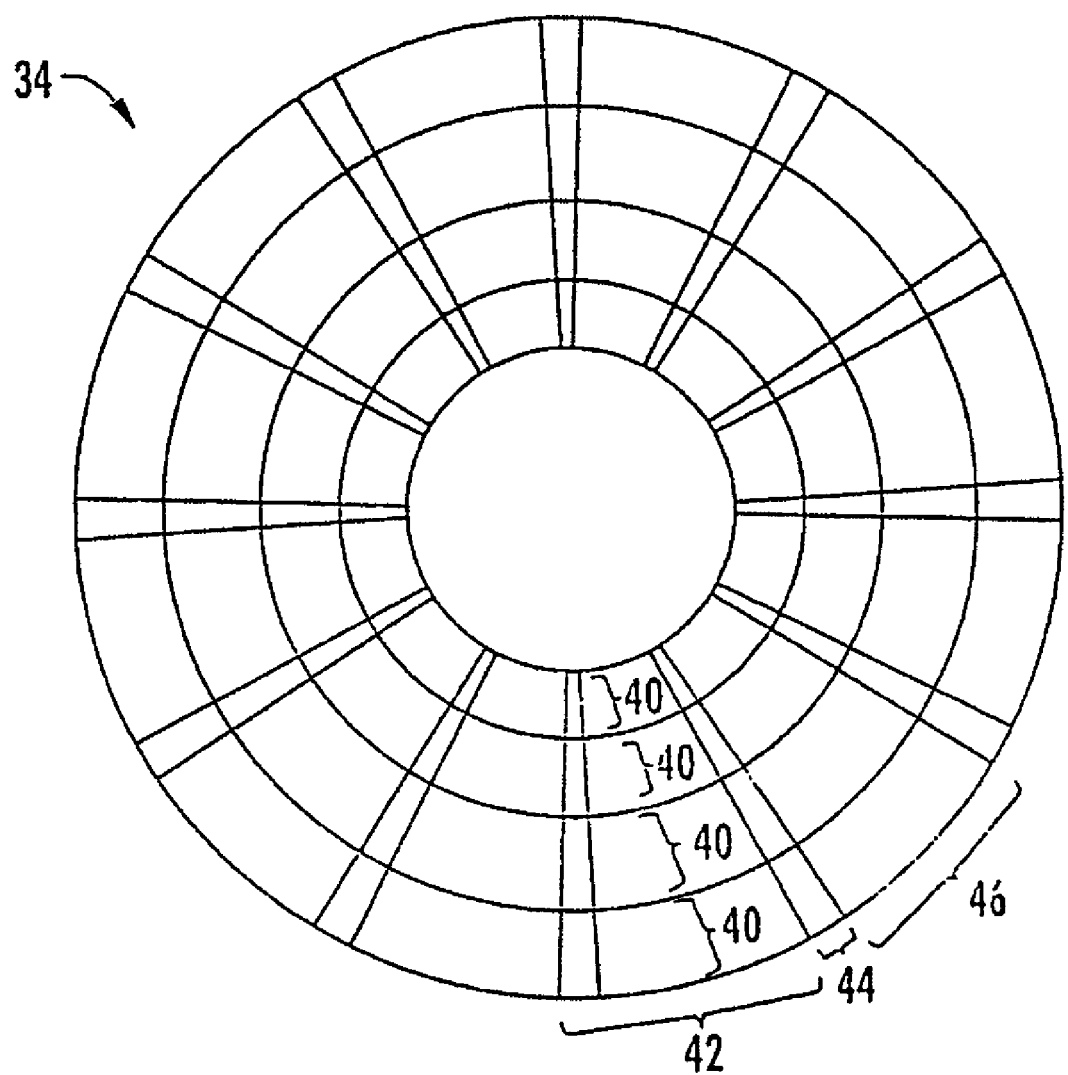
FIG. 4 is a top view of a data storage disk and illustrates tracks and spokes, with each of the spokes being divided into a servo spoke and a data spoke.

FIG. 4 further illustrates one of the disks 34 of an exemplary disk drive, according to embodiments of the present invention. Data is stored on the disk 34 within a number of concentric tracks 40 (or cylinders). Each track is divided into a plurality of radially extending spokes (sectors) 42 on the disk 34. Each spoke 42 is further divided into a servo spoke (sector) 44 and a data spoke (sector) 46. The servo spokes 44 of the disk 34 are used to, among other things, accurately position a transducer 20 so that data can be properly written onto and read from the disk 34. The servo spokes 44 can provide transducer location information such as a track identification field and data block address, for identifying the track and data block. The data spokes 46 are where non-servo related data (i.e., data from a host device) is stored and retrieved. Such data, upon proper conditions, may be overwritten. A host device can write data to and read data from the disk drive 10 by communicating respective write commands and read commands to the controller 30 that identify the associated block addresses of the disk 34 on which data is to be transferred.

Figure 5:
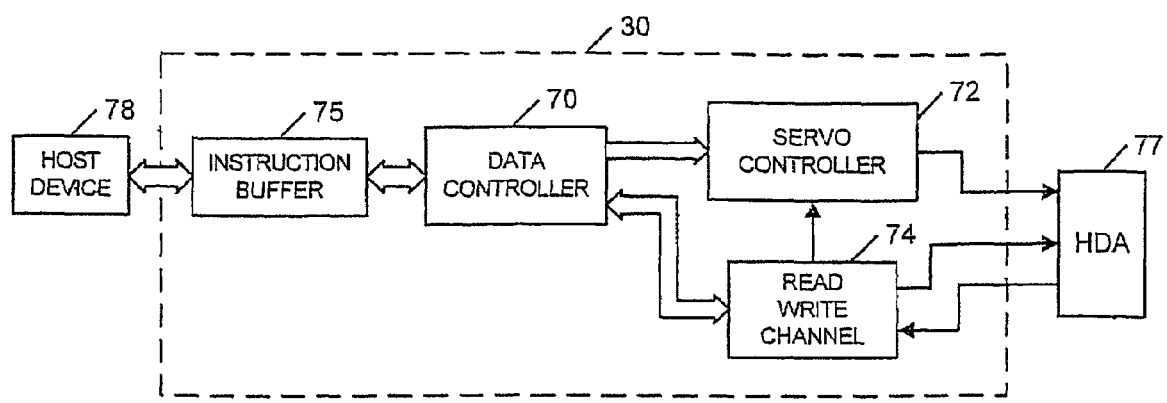
FIG. 5 illustrates a disk drive controller according to some embodiments of the present invention.

Referring to FIG. 5, a controller 30 configured to detect disk drive altitude, according to some embodiments of the present invention, includes a data controller 70, a servo controller 72, a read/write channel 74, and an instruction buffer 75. The illustrated controller 30 includes two separate controllers 70, 72, instruction buffer 75, and read/write channel 74 for purposes of illustration and discussion only. It is to be understood that the functionality that is described herein for one or more of those components may be consolidated in fewer components or distributed among more components.

The controller 30 is configured to respond to read and write instructions from a host device 78 by reading and writing data on a head disk assembly (HDA) 77. The HDA 77 can include the actuator arm assembly 18, the disk stack 12, and the spindle motor 14 (FIGS. 1-3). More particularly, read instructions and write instructions with associated data and block addresses from the host device 78 can be buffered in the instruction buffer 75. The data controller 70 can be configured to carry out a buffered write instruction by formatting the associated data into blocks with the appropriate header information, and to transfer the formatted data from the instruction buffer 75, via the read/write channel 74, to block addresses on the disk 34 that are identified by the write command. The data controller 70 can also be configured to carry out a buffered read instruction by reading, via the read write channel 74, data from block addresses on the disk 34 that are identified by the read instruction and to transfer the data to the host device 78.

The servo controller 72 controls operation of the actuator arm 24 and generally performs two distinct functions: seek control and track following. The seek control function includes controllably moving the actuator arm 24 such that a transducer 20 is moved from an initial position to a target track position. In general, the seek function is initiated when a host device 78 associated with the disk drive 10 issues a command to read data from or write data to a target track on a disk 34. Once a transducer 20 has been moved sufficiently close to the target track by the seek function of the control system, the track following function of the servo controller 72 is activated to center and maintain the transducer 20 on the target track until the desired data transfers are completed.

The track following function of the servo controller 72 generally includes maintaining a transducer 20 at a desired position with respect to a track being followed (e.g., over a centerline of the track). Typically, a transducer 20 must be moved slightly during track following to maintain a desired position over a track. This is because, due to various factors, a track may appear to move beneath a transducer 20. There are numerous outside influences which can make it difficult for the servo controller 72 to maintain the desired position of a transducer over a track, one such influence is known as "runout."

Runout generally refers to deviation from perfect circular motion and, more particularly, refers to variation in the distance between an external point of reference and a passing surface of a rotating object. "Repeatable runout" involves periodic deviations that occur with predictable regularity (hereafter "RRO"). "Nonrepeatable runout" involves random perturbations due to, for example, turbulent air flow inside the drive, bearing slop, shock events, and so on (hereafter "NRRO"). In the context of a disk drive, RRO is "repeatable" because it occurs in sync with a spinning disk. Without limitation, RRO may be caused by one or more of the following mechanical sources: a) spindle motor runout; b) disk slippage; c) disk warping; d) disturbances converted to RRO during a servo writing process due to, for example, NRRO, vibrations, resonances, media defects, or disk distortion due to clamping of the HDA. RRO may also be caused by electromagnetic imperfections due to low quality servo positioning bursts, even if they were mechanically recorded on the ideal circle. Such low quality servo positioning bursts can yield incorrect position information.

Inside a disk drive there is an appreciable level of induced airflow that comes, primarily, from the spinning disk(s). The actuator, which positions the transducers radially partially disrupts the airflow. The complex airflow that results has components of repeatable flow and purely chaotic non-repeatable turbulent flow. These air flows become forcing functions that, in turn, induce sympathetic response in the disks, the actuator arms, the suspensions, etc. The result of these vibrations is to force a transducer off of a desired data track. This phenomena, thus, limits the ability to read and record magnetic data tracks at high densities. Inasmuch as it is undesirable to have a transducer moving off track, it is well established that a transducer can be used as an "off-track" or "track misregistration" transducer. Track misregistration (TMR) can be mathematically deconvolved into RRO and NRRO components, as would be understood by one skilled in the art. Track misregistration is any relative off-track position between a transducer and a data track. Any relative motion, be it from actuator motion or runout, can create TMR. Embodiments of the present invention allow for altitude detection via TMR that results from purely disk runout or from purely actuator-related motions or from any combinations and constituents thereof.

Applicants have discovered that NRRO signatures at different frequencies provide a means for estimating, or at least bracketing, the altitude at which a disk drive is operating. Without limitation, the frequency or frequencies dependent "signatures" of NRRO are dependent upon construction, structures, assemblies, materials selection, operational characteristics, servo positioning algorithms, etc., of a given disk drive design. Moreover, applicants have discovered that analysis of components of NRRO at different radial locations of a disk further enhance differences in the various NRRO signatures and thus allow a confident estimation of whether a particular disk drive is operating near sea level, near 5,000 feet above sea level, or at 10,000 feet and higher above sea level, for example. The complex nature and underlying causes of the NRRO manifestations necessarily implies that the NRRO signatures be characterized on a case-by-case basis. A skilled practitioner can then decide which signature(s) to utilize individually or collectively to achieve a desired level of confidence in ascertaining the operating altitude or altitude range.

Figure 6:
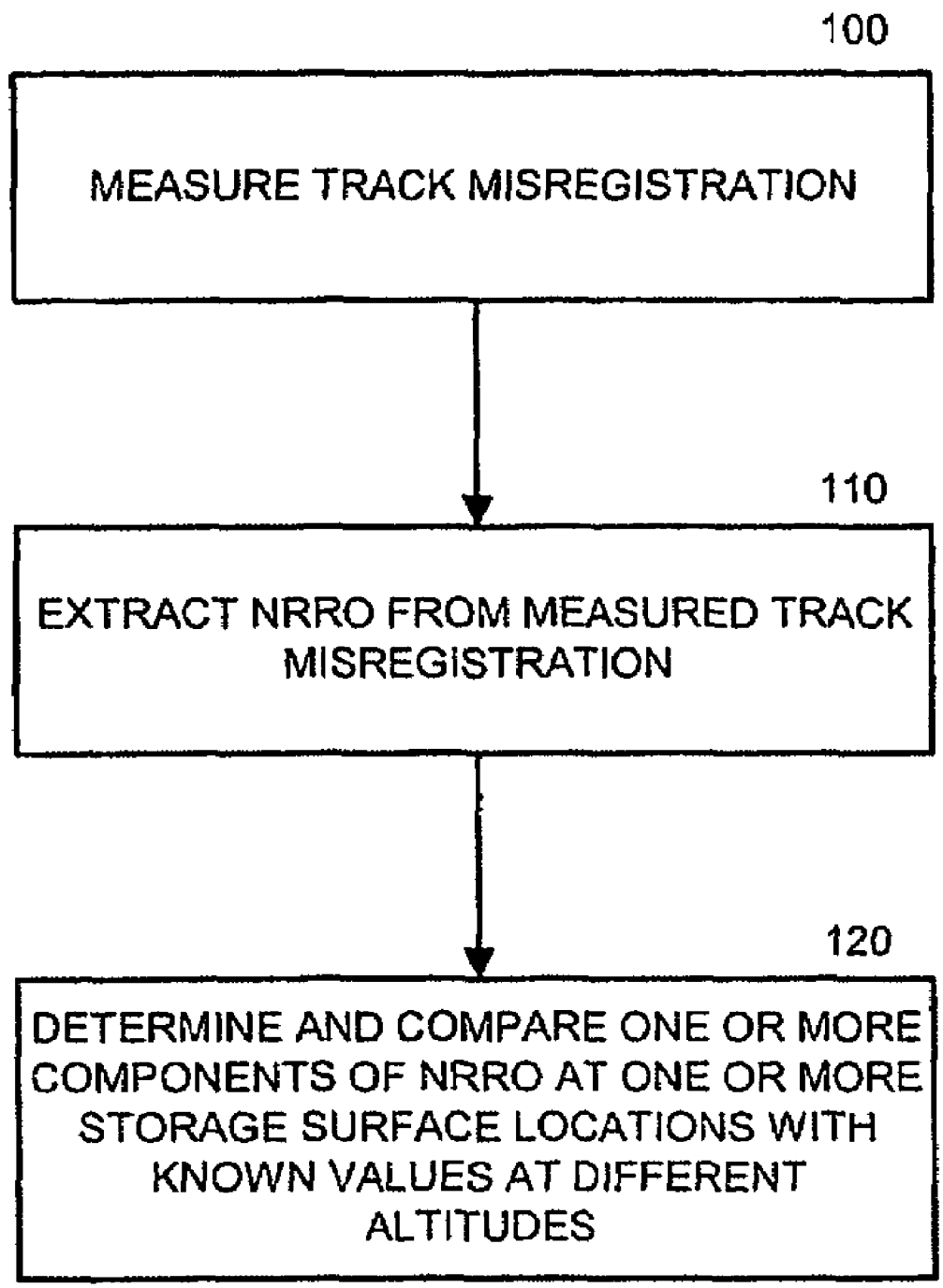
FIG. 6 is a flowchart of operations implemented by a disk drive controller to detect altitude, according to some embodiments of the present invention.

Referring to FIG. 6, a flowchart of operations carried out by a disk drive controller, such as the controller 30 in FIG. 1, to determine disk drive altitude, according to some embodiments of the present invention, is illustrated. The controller measures TMR (Block 100) and then extracts NRRO from the measured TMR (Block 110). One or more components of NRRO (e.g., windage torque on an actuator, structural modes excited by airflow within a disk drive, etc.) at one or more storage surface locations on a disk are determined and compared to known values at different altitudes (Block 120).

The constituent components of NRRO (windage torque, structural modes, etc.) are extracted from the full TMR signature using spectral (frequency and modal analysis) and statistical deconvolution algorithms well known to those skilled in this art. The practice of deconvolving the various elements of NRRO is a well understood technique to those skilled in this art.

As would be understood by one skilled in the art, the storage surface of a disk is typically divided into an inner diameter (ID) region, a middle diameter (MD) region, and an outer diameter (OD) region. According to some embodiments of the present invention, components of NRRO are analyzed at one or more of the ID, MD, and OD regions. For example, a controller may analyze windage torque at the OD region of a disk and structural modes at the MD region of the disk. However, embodiments of the present invention are not limited to just the ID, MD or OD radial regions of a disk. Any region of a disk may be utilized in accordance with embodiments of the present invention.

Figure 7A:
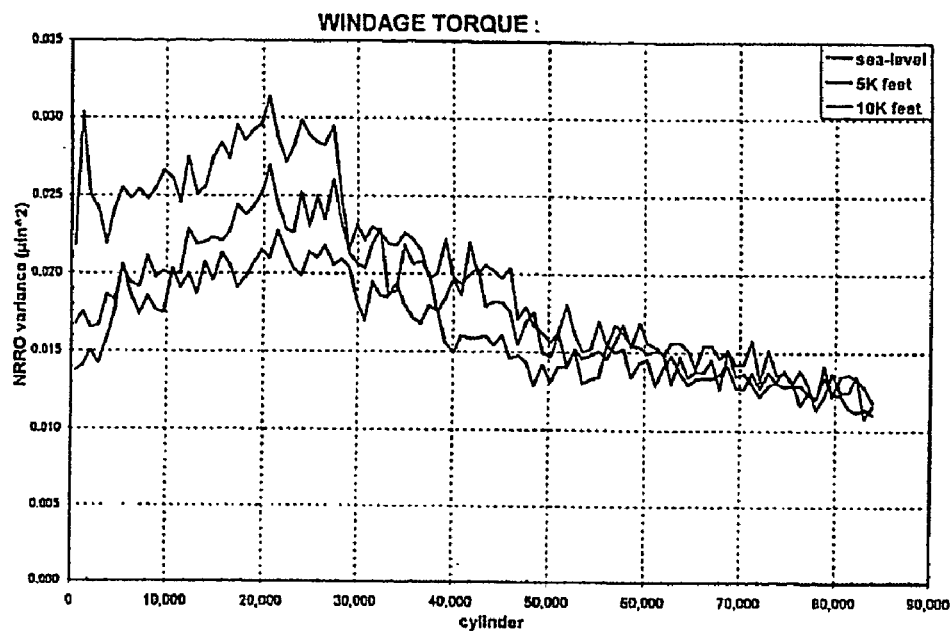
FIG. 7A is a graph that illustrates a windage torque component of non-repeatable runout for three different elevations at different locations of a disk storage surface.
Figure 7B:
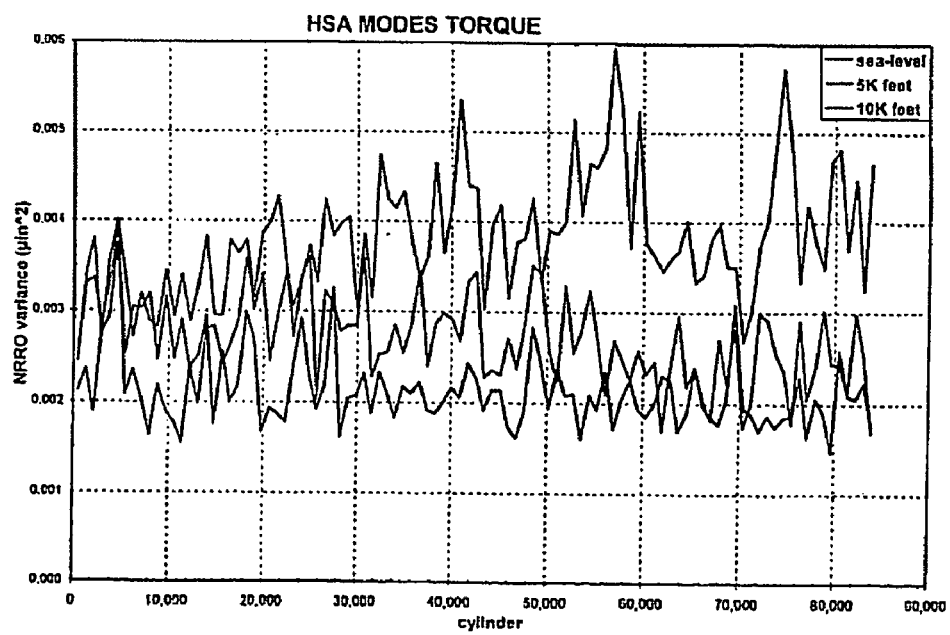
FIG. 7B is a graph that illustrates structural modes component of non-repeatable runout for three different elevations at different locations of a disk storage surface.

Referring to FIGS. 7A-7B, Applicants have further discovered that windage torque is particularly affected by altitude in the OD region of a disk surface, and structural modes are particularly affected by altitude in the MD region. However, embodiments of the present invention are not limited to measurement and analysis of NRRO components at particular disk storage surface radial locations. Instead, NRRO components can be measured and analyzed at any disk storage surface radial location, without limitation. Moreover, any type or combination of NRRO components may be utilized.

Those skilled in this art will recognize that TMR (and it's derivative NRRO) come from numerous sources related to sympathetic motion (resonance) of internal design features driven to cause TMR by air flow in the disk drive. In addition to the already cited windage torque, numerous other discrete manifestations may occur. One such manifestation might be any one or more vibrational modes of the suspension 22 or the actuator arms 24 (FIG. 3). Alternatively, one or more of the disks 36 (FIG. 2) may be driven into resonance in one or more vibrational modes due to air flow. Another structure susceptible to multi-modal response is the flexible connector(s) that afford an electro-mechanical coupling between the actuator arm assembly 18 (FIG. 3) and a printed circuit board 32 (FIG. 1).

There are virtually limitless combinations of vibrating structures or elements vibrating in numerous modes. However, since each mode has a corresponding frequency associated with it, the effects of multiple modes from multiple sources can be aggregated by examining NRRO within one or more frequency bands. A frequency band, for example, may be a frequency range from one frequency $F_1$ to a higher frequency $F_2$. A second frequency band could cover frequencies $F_3$ to $F_4$, and so on. For a given drive design, these bands will constitute a "signature" of NRRO. Since the ability of air flow to excite the response modes was discovered by Applicants to be altitude dependent, one can search for relationships between NRRO and altitude and then assign a signature that is typical of a given set of mode(s) at a given track location in a disk drive (e.g., ID, MD, or OD) at a given altitude.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. The invention is defined by the following claims, with equivalents of the claims to be included therein.

That which is claimed is:

1. A disk drive, comprising:
   a rotatable storage disk having a storage surface;
   a transducer that is configured to read information from the storage surface;
   an actuator that is configured to position the transducer relative to the storage surface; and
   a controller that determines disk drive altitude, wherein the controller is configured to:
      determine one or more contributory components to non-repeatable runout (NRRO) at one or more radial locations on the storage surface; and
      compare the determined one or more NRRO contributory components to known values for one or more NRRO contributory components at different altitudes to determine an altitude at which the disk drive is operating.

2. The disk drive of claim 1, wherein the storage surface has an inner diameter (ID) region, a middle diameter (MD) region, and an outer diameter (OD) region, and wherein the controller is configured to determine contributory components to NRRO at each of the ID, MD, and OD regions.

3. The disk drive of claim 1, wherein the controller is configured to measure track misregistration (TMR) and to extract NRRO from the measured TMR.

4. The disk drive of claim 1, wherein contributory components of NRRO comprise windage torque on the actuator.

5. The disk drive of claim 1, wherein contributory components of NRRO comprise structural modes excited by airflow.

6. The disk drive of claim 1, wherein contributory components of NRRO comprise disk modes excited by airflow.

7. A disk drive, comprising:
a rotatable storage disk having a storage surface with an inner diameter (ID) region, middle diameter (MD) region, and an outer diameter (OD) region;
a transducer that is configured to read information from the storage surface;
an actuator that is configured to position the transducer relative to the storage surface; and
a controller that determines disk drive altitude, wherein the controller is configured to:
measure track misregistration (TMR);
extract NRRO from measured TMR;
determine one or more contributory components to NRRO at two or more of the ID, MD, and OD regions of the storage surface; and
compare the determined one or more NRRO contributory components to known values for the one or more NRRO contributory components at different altitudes to determine an altitude at which the disk drive is operating.

8. The disk drive of claim 7, wherein contributory components of NRRO comprise windage torque on the actuator.

9. The disk drive of claim 7, wherein contributory components of NRRO comprise structural modes excited by airflow.

10. The disk drive of claim 7, wherein contributory components of NRRO comprise disk modes excited by airflow.

11. A method of determining altitude of a disk drive, wherein the disk drive includes a rotatable storage disk having a storage surface, a transducer that reads information from the disk surface, and an actuator that positions the transducer relative to the storage surface, the method comprising:
determining one or more contributory components to non-repeatable runout (NRRO) at one or more radial locations on the storage surface; and
comparing the determined one or more NRRO contributory components to known values for one or more NRRO contributory components at different altitudes to determine an altitude at which the disk drive is operating.

12. The method of claim 11, wherein the storage surface has an inner diameter (ID) region, a middle diameter (MD) region, and an outer diameter (OD) region, and wherein determining one or more contributory components to NRRO comprises determining contributory components to NRRO at two or more of the ID, MD, and OD regions of the storage surface.

13. The method of claim 11, wherein determining one or more contributory components to NRRO comprises measuring track misregistration (TMR) and extracting NRRO from measured TMR.

14. The method of claim 11, wherein contributory components of NRRO comprise windage torque on the actuator.

15. The method of claim 11, wherein contributory components of NRRO comprise structural modes excited by airflow.

16. The method of claim 11, wherein contributory components of NRRO comprise disk modes excited by airflow.

17. A method of determining altitude of a disk drive, wherein the disk drive includes a rotatable storage disk having a storage surface with an inner diameter (ID) region, a middle diameter (MD) region, and an outer diameter (OD) region; a transducer that reads information from the disk surface; and an actuator that positions the transducer relative to the storage surface, the method comprising:
measuring track misregistration (TMR);
extracting non-repeatable runout (NRRO) from measured TMR;
determining one or more contributory components to NRRO at two or more of the ID, MD, and OD regions of the storage surface; and
comparing the determined one or more NRRO contributory components to known values for the one or more NRRO contributory components at different altitudes to determine an altitude at which the disk drive is operating.

18. The method of claim 17, wherein contributory components of NRRO comprise windage torque on the actuator, and wherein determining one or more contributory components to NRRO comprises determining windage torque at the OD region of the storage surface.

19. The method of claim 17, wherein contributory components of NRRO comprise structural modes excited by airflow, and wherein determining one or more contributory components to NRRO comprises determining structural modes at the MD region of the storage surface.

\* \* \* \* \*